(12) United States Patent
Stoffel et al.

(10) Patent No.: US 7,582,188 B2
(45) Date of Patent: Sep. 1, 2009

(54) COMPOSITION AND INK RECEIVING SYSTEM INCORPORATING THE COMPOSITION

(75) Inventors: John L. Stoffel, San Diego, CA (US); Hai Q Tran, San Diego, CA (US); Ronald A. Askeland, San Diego, CA (US); Lawrence E Gibson, San Diego, CA (US); Steven D Schultz, Loveland, OH (US); Michael F Koenig, Loveland, OH (US); Sen Yang, Loveland, OH (US); William R Sperry, San Diego, CA (US); Richard R Hartman, Memphis, TN (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 538 days.

(21) Appl. No.: 11/250,304

(22) Filed: Oct. 14, 2005

(65) Prior Publication Data
US 2007/0087136 A1    Apr. 19, 2007

(51) Int. Cl.
*D21H 21/16*    (2006.01)
*D21H 17/66*    (2006.01)
*D21H 23/24*    (2006.01)

(52) U.S. Cl. .................. 162/158; 162/181.2; 162/183; 162/185; 428/32.19; 428/32.21

(58) Field of Classification Search ......... 162/134–137, 162/158, 164.1, 181.2, 183–186; 347/105, 347/106; 428/32.1, 32.18, 32.19, 32.21, 428/32.3
See application file for complete search history.

(56) References Cited

U.S. PATENT DOCUMENTS

| 4,740,420 | A | 4/1988 | Akutsu et al. |
| 4,900,620 | A | 2/1990 | Tokita et al. |
| 5,380,361 | A | 1/1995 | Gill |
| 5,472,485 | A | 12/1995 | Pandian et al. |
| 5,522,968 | A | 6/1996 | Kuroyama et al. |
| 6,123,760 | A | 9/2000 | Varnell |
| 6,162,328 | A | 12/2000 | Cenisio et al. |
| 6,207,258 | B1 * | 3/2001 | Varnell ............ 428/32.1 |
| 6,268,414 | B1 | 7/2001 | Lin |
| 6,359,040 | B1 | 3/2002 | Burdick |
| 6,406,594 | B1 | 6/2002 | Palmer et al. |
| 6,660,347 | B2 | 12/2003 | Steiger |
| 2003/0227531 | A1 | 12/2003 | Hosoi et al. |

FOREIGN PATENT DOCUMENTS

| EP | 1 079 356 A1 | 2/2001 |
| EP | 1 566 281 A2 | 8/2005 |
| WO | WO 99/06219 A | 2/1999 |

* cited by examiner

*Primary Examiner*—Eric Hug

(57) ABSTRACT

A composition includes an alkenyl succinic anhydride sizing agent or an alkyl ketene dimer sizing agent. The alkenyl succinic anhydride sizing agent is present in an amount ranging from about 1.0 pounds per ton to about 4.0 pounds per ton. The alkyl ketene dimer sizing agent is present in an amount ranging from about 2.0 pounds per ton to about 10.0 pounds per ton. A metallic salt is also incorporated in the composition.

14 Claims, No Drawings

COMPOSITION AND INK RECEIVING SYSTEM INCORPORATING THE COMPOSITION

BACKGROUND

The present disclosure relates generally to ink systems, and more particularly to ink receiving systems.

There is a variety of ink receiving systems that are suitable for use with inkjet printing. When combined with inkjet printing, some of these systems are capable of providing relatively fast dry times for black inks, and other systems are capable of producing bold, sharp printed text and high optical density. Some systems that are designed to provide faster black ink dry times may, in some instances, result in lesser quality printed text and lower optical density. Further, some systems designed to provide higher quality text and high optical density may, in some instances, result in slower black ink dry times.

Furthermore, there are a variety of ink sets that are suitable for use with a variety of ink receiving systems. Some of the ink sets are capable of providing a large color gamut on plain paper, and other of the ink sets are capable of providing superior resistance to light fading on photo paper. Some ink sets that are designed to provide a large color gamut on plain paper may, in some instances, result in lower fade resistance. Further, some ink sets designed to provide higher fade resistance may, in some instances, provide lower color gamut on plain paper.

As such, it would be desirable to provide an ink receiving system that is capable of achieving relatively fast black ink dry times while resulting in bold, sharp printed text and high optical density. It would also be desirable to provide an ink receiving system that is capable of achieving high color gamut with an ink set having superior light resistance.

SUMMARY

A composition includes an alkenyl succinic anhydride internal sizing agent or an alkyl ketene dimer internal sizing agent. The alkenyl succinic anhydride internal sizing agent is present in an amount ranging from about 1.0 pounds per ton to about 4.0 pounds per ton. The alkyl ketene dimer internal sizing agent is present in an amount ranging from about 2.0 pounds per ton to about 10.0 pounds per ton. A metallic salt is also incorporated in the composition.

DETAILED DESCRIPTION

The embodiment(s) of the ink receiving system may advantageously be used with a variety of printing techniques, including, but not limited to inkjet printing and dry electrophotographic printing. Without being bound to any theory, it is believed that the systems may advantageously provide relatively fast dry times without compromising the quality of the printed images. Still further, a lightfast pigment based colorant may be used on a variety of media (e.g. plain paper or photopaper), each of which includes embodiment(s) of the composition disclosed herein. It is believed that the inclusion of embodiment(s) of the composition(s) allows the achievement of a desirable color gamut, as well as a desirable fade resistance.

An embodiment of the ink receiving system includes a substrate having a composition therein. It is to be understood that any substrate may be selected that is suitable for having indicia (e.g. alphanumeric indicia and/or graphical indicia) printed thereon. In an embodiment, the substrate is paper (non-limitative examples of which include plain copy paper or papers having recycled fibers therein) or photopaper (non-limitative examples of which include polyethylene or polypropylene extruded on one or both sides of paper), and/or combinations thereof. In an embodiment, the substrate has a thickness along substantially the entire length ranging between about 0.025 mm and about 0.5 mm.

As used herein, the term "composition" includes ingredients that may be incorporated in the substrate substantially simultaneously, sequentially, and/or at different times. For example, the ingredients may be added during wet end processing, during size press processing, and/or during off-line coating processing when the substrate is paper.

The composition has one of two different types of internal sizing agents. In an embodiment, the sizing agent is an alkenyl succinic anhydride (ASA) internal sizing agent, and in another embodiment, the sizing agent is an alkyl ketene dimer (AKD) internal sizing agent.

When the alkenyl succinic anhydride internal sizing agent is used, it is present in the composition in an amount ranging from about 1.0 pounds per ton (about 0.05%) to about 4.0 pounds per ton (about 0.20%). In a non-limitative example in which the ASA is used in plain paper, the ASA is present in an amount ranging from about 1.0 pounds per ton (about 0.05%) to about 3.0 pounds per ton (about 0.15%). In still another non-limitative example in which the ASA is used in plain paper, the ASA is present in an amount ranging from about 1.2 pounds per ton (about 0.06%) to about 1.8 pounds per ton (about 0.09%). In an alternate non-limitative example in which the ASA is used in paper having recycled fibers (e.g. greater than about 20% recycled fibers), the ASA may be present in a higher amount, for example in an amount ranging from about 3.0 pounds per ton (about 0.15%) to about 4.0 pounds per ton (about 0.20%).

When the alkyl ketene dimer sizing (AKD) agent is used, it is present in the composition in an amount ranging from about 2.0 pounds per ton (about 0.10%) to about 10.0 pounds per ton (about 0.50%). In an alternate embodiment, the AKD may be present in the composition in an amount ranging from about 2.0 pounds per ton (about 0.10%) to about 7.0 pounds per ton (about 0.35%).

In another embodiment, the composition contains both ASA and AKD internal sizing agents. In a non-limitative example of this embodiment, the range of total sizing agent is from about 1.0 lb/ton to about 10.0 lbs/ton.

Without being bound to any theory, it is believed that the range of internal sizing agent in composition(s) of the present embodiment(s) may allow the substrate to be used with lightfast colorants (e.g. pigment based inks) substantially without compromising a desirable color gamut and without compromising desirable fade resistance.

The composition may also vary the total sizing of the substrate. In an embodiment, the composition provides the substrate with a total sizing of less than about 70 as measured by the Hercules Sizing Test. In another embodiment, the composition provides the substrate with a total sizing of less than about 30 as measured by the Hercules Sizing Test. Embodiments of the system or substrate having the relatively low (less than about 70) total sizing are relatively absorptive and allow for relatively fast drying times.

The internal sizing agent of the composition is incorporated into the substrate. In an embodiment, the internal sizing agent is incorporated during the manufacture of the substrate in the wet end process of papermaking. It is to be understood that the sizing agent may be soluble in an aqueous medium (e.g. water). The sizing agent may be soluble in the aqueous medium at a pH ranging from about 4 to about 10. In a non-limitative example, the sizing agent is soluble at a pH ranging from about 4 to about 6.5. In still another non-limitative example, the sizing agent is soluble at a pH ranging from about 9.5 to about 10.

The composition also includes a metallic salt. The metallic salt may be incorporated in the substrate via the wet end operation and/or the size press process. As such, the metallic salt may be dispersed in the substrate with the sizing agent and/or may be added separately from the sizing agent. In an embodiment where a surface sizing agent (described further hereinbelow) is added, it is to be understood that the metallic salt may be added to the substrate with the surface sizing agent. Non-limitative examples of the metallic salt include calcium chloride, magnesium chloride, aluminum chloride, beryllium chloride, calcium nitrate, magnesium nitrate, aluminum nitrate, beryllium nitrate and/or combinations thereof. Without being bound to any theory, it is believed that the metallic salt advantageously assists in immobilizing pigment or dye that is printed on the substrate relatively quickly, thereby keeping the ink near the substrate surface and substantially preventing the colorant from penetrating or spreading (wicking, smearing).

It is to be understood that the metallic salt may be soluble in a medium (e.g. water) at a pH ranging from about 4 to about 10. In a non-limitative example, the metallic salt is soluble at a pH ranging from about 4 to about 6.5. In still another non-limitative example, the metallic salt is soluble at a pH ranging from about 9.5 to about 10.

In an embodiment, the system also includes a surface sizing agent in the substrate. The surface sizing agent is added to the substrate via the size press operation in the manufacturing process of paper. It is to be understood that the surface sizing agent may be soluble in an aqueous medium (e.g. water). In an embodiment, anionic starch is used as a surface sizing agent and is incorporated in at the size press. It is to be understood that anionic starch may be used in conjunction with more hydrophobic sizing agents to assist in controlling overall sizing, as measured, for example via the Hercules Sizing Test (HST). Non-limitative examples of other suitable surface sizing agents include corn starch, modified starches (non-limitative examples of which include ethylated starches or cationic starches), styrene based emulsion polymers, AKD, and/or combinations thereof. It is to be understood that the amount of starch-based surface sizing agent in the system generally ranges from about 30 lbs/ton to about 150 lbs/ton. It is to be further understood that the amount of emulsion polymer or AKD surface sizing agent in the system generally ranges from about 0 lbs/ton to about 6 lbs/ton.

It is to be understood that the system(s) disclosed herein may be used with a variety of printing techniques (non-limitative examples of which include inkjet printing and dry electrophotographic printing) and a variety of inks (non-limitative examples of which include dye based inks and color pigment based inks). It is to be further understood that ink may be preferentially jetted from the printer onto the system in response to signals received by the printer.

In a non-limitative example where indicia are formed on the system with black pigment ink having a binder therein, the indicia have substantially increased optical density and substantially decreased drytime.

In another non-limitative example where indicia are formed on the system with pigmented ink, the indicia have substantially increased lightfastness and substantially increased color gamut. In one embodiment of the system disclosed herein, pigment based color ink sets, as opposed to dye based color ink sets, may be used to achieve enhanced lightfastness and color gamut. One non-limitative example of a colorant in the color pigmented ink includes yellow colorant having a blue wool scale greater than about 7. In a further non-limitative embodiment, the color pigmented ink is selected from the disazo yellow pigment class, the bis-acetoacetarylide yellow pigment class, and combinations thereof. Yellow ink 93 and yellow ink 128 generally belong to the disazo yellow pigment class, while yellow ink 155 generally belongs to the bis-acetoacetarylide yellow pigment class. Generally, color pigmented inks provide relatively good fade resistance on photopaper, however, such inks may not be suitable for plain paper as the color gamut is relatively poor. Plain paper including embodiments of the composition disclosed herein may receive color pigment inks and may achieve a good color gamut when compared to the color gamut achieved on plain paper. As such, it is believed that lightfast, low strength colorants may be used with the ink receiving system disclosed herein, as the system advantageously improves the color gamut of these inks on plain paper and maintains the fade resistance on photo paper.

Without being bound to any theory, it is believed that the combinations of the disclosed system and the respective inks (e.g. black pigment ink, color pigment ink) result in the increased optical density, lightfastness, and/or color gamut. In addition to these advantages, the system may also provide relatively fast dry times.

Still further, embodiment(s) of the system may advantageously have increased saturation and chroma when compared to non-treated substrates. In a non-limitative example in which non-treated paper is compared to an embodiment of the system described herein, red saturation increases from about 0.91 (non-treated paper) to about 1.24 (system disclosed herein), and red chroma increases from about 52.4 (non-treated paper) to about 65.5 (system disclosed herein).

To further illustrate embodiment(s) of the present disclosure, the following examples are given. It is to be understood that these examples are provided for illustrative purposes and are not to be construed as limiting the scope of embodiment(s) of the present disclosure.

EXAMPLE 1

Various yellow inks were printed on different plain papers, the first (i.e. plain paper 1) of which included an embodiment of the composition described herein. Plain paper 1 included about 1.8 lb/ton of alkenyl succinic anhydride sizing agent and about 20-23 lb/ton of calcium chloride. Plain paper 1 also had an HST ranging between about 50 and about 70. Plain paper 2 included about 2.0 lb/ton of alkenyl succinic anhydride sizing agent and no calcium chloride. The HST of plain paper 2 was about 150.

The inks were printed using different pens labeled 1-8. The following chart illustrates the average chroma (C*) value for each of the yellow inks printed from a particular pen. The yellow inks used were dispersions of Pigment Yellow 74, Pigment Yellow 155, Pigment Yellow 128, and Pigment Yellow 93. The relatively high C* values for plain paper 1 indicate that the inks may produce vivid color on plain paper that includes therein the composition(s) of the present disclosure.

TABLE 1

Average C* for Yellow Inks from Respective Pens

| | PY 74 | | PY 155 | | PY 128 | | PY 93 | |
|---|---|---|---|---|---|---|---|---|
| | 1 | 2 | 3 | 4 | 5 | 6 | 7 | 8 |
| Plain Paper 1 | 94.97 | 96.35 | 89.88 | 88.02 | 81.87 | 82.07 | 91.26 | 91.07 |
| Plain Paper 2 | 93.54 | 94.31 | 87.33 | 84.21 | 78.93 | 77.53 | 88.05 | 88.63 |

Table 2 illustrates the average of the chroma values shown in Table 1 for each of the inks. For example, the average for PY 74 on plain paper 1 is the average of the chroma values for that ink from pens 1 and 2 shown in Table 1.

TABLE 2

Average C* for Yellow Inks

| | PY 74 | PY 155 | PY 128 | PY 93 |
|---|---|---|---|---|
| Plain Paper 1 | 95.66 | 88.95 | 81.97 | 91.17 |
| Plain Paper 2 | 93.92 | 85.77 | 78.23 | 88.34 |

TABLE 3

Average lightfastness (years)

| | PY 74 | PY 155 | PY 128 | PY 93 |
|---|---|---|---|---|
| Example 1 | 65 | 320 | 4200 | 406 |
| Example 2 | 51 | 196 | 2290 | 311 |

EXAMPLE 2

Plain papers (labeled A-J in Table 4) having different amounts of ASA internal sizing agent and metallic salt were prepared. Images were printed on both the felt side and the wire side of the paper. A dye-based printer (HP Photosmart 8250 Inkjet Printer, available from Hewlett Packard Company, located in Palo Alto, Calif.) was used to print text on the various papers, and the print quality of the text was tested. A pigment-based printer (HP Deskjet 6122 available from Hewlett Packard Company, located in Palo Alto, Calif.) was used to print text on the various papers, and the black optical density (OD) and the percentage of ink transferred were tested.

TABLE 4

Black Optical Density, % Ink Transferred, Text Print Quality

| Media | Side | HST, sec | ASA Internal Size (IS) lb/ton | Surface Size (SS) lb/ton | IS/SS, Ratio | CaCl2, lb/ton | Black OD | % Ink Transferred | Text Print Quality |
|---|---|---|---|---|---|---|---|---|---|
| Paper A | Felt | 103 | 2 | 1.3 | 1.54 | 0 | 1.35 | 52 | 2 |
| Paper A | Wire | — | 2 | 1.3 | 1.54 | 0 | 1.35 | 58 | — |
| Paper B | Felt | 123 | 1.9 | 1.9 | 1.00 | 20 | 1.56 | 32 | 3 |
| Paper B | Wire | 129 | 1.9 | 1.9 | 1.00 | 20 | 1.56 | 25 | 3 |
| Paper C | Felt | 133 | 1.85 | 2 | 0.93 | 25 | 1.54 | 40 | 3 |
| Paper C | Wire | 145 | 1.85 | 2 | 0.93 | 25 | 1.54 | 32 | 3 |
| Paper D | Felt | 123 | 1.77 | 2 | 0.89 | 25 | 1.52 | 28 | 4 |
| Paper D | Wire | 119 | 1.77 | 2 | 0.89 | 25 | 1.52 | 25 | 4 |
| Paper E | Felt | 134 | 1.7 | 2 | 0.85 | 25 | 1.54 | 35 | 4 |
| Paper E | Wire | 147 | 1.7 | 2 | 0.85 | 25 | 1.54 | 26 | 4 |
| Paper F | Felt | 115 | 1.6 | 2 | 0.8 | 25 | 1.47 | 28 | 2 |
| Paper F | Wire | 133 | 1.6 | 2 | 0.8 | 25 | 1.47 | 23 | 2 |
| Paper G | Felt | 52 | 1.3 | 2 | 0.65 | 20 | 1.53 | 13 | 1 |
| Paper G | Wire | 45 | 1.3 | 2 | 0.65 | 20 | 1.53 | 9 | 1 |
| Paper H | Felt | 48 | 1.3 | 2.5 | 0.52 | 20 | 1.56 | 10 | 1 |
| Paper H | Wire | 47 | 1.3 | 2.5 | 0.52 | 20 | 1.56 | 11 | 1 |
| Paper I | Felt | 48 | 1.3 | 3 | 0.43 | 20 | 1.55 | 12 | 2 |
| Paper I | Wire | 44 | 1.3 | 3 | 0.43 | 20 | 1.55 | 12 | 2 |
| Paper J | Felt | 21 | 1.2 | 1.3 | 0.92 | 25 | 1.56 | 7 | 1 |
| Paper J | Wire | — | 1.2 | 1.3 | 0.92 | 25 | 1.56 | 6 | — |

Table 3 illustrates the average lightfastness, in years, for each of the inks. The lightfastness rating of each ink on a specific media was measured under a fluorescent light source. The standard assumption is a 12-hour day, 450 lux, 50% relative humidity, and a 35% density loss limit. The media used in Example 1 was a flyer and brochure paper including a coating, and the media used in Example 2 was an art paper particularly suitable for watercolor paints.

Generally, those papers including embodiment(s) of the composition disclosed herein (specifically, those having ASA ranging in amounts from about 1.2 lbs/ton to about 1.8 lbs/ton) performed suitably in the tests that were conducted. Papers G, H, I and J exhibit very good percentages of ink transferred and good print quality. Papers B, D, E, and F exhibit very good print quality and good percentages of ink transferred.

While several embodiments have been described in detail, it will be apparent to those skilled in the art that the disclosed embodiments may be modified. Therefore, the foregoing description is to be considered exemplary rather than limiting.

What is claimed is:

1. A paper, comprising:
   an alkenyl succinic anhydride internal sizing agent in an amount ranging from about 1.0 pounds per ton to about 4.0 pounds per ton of paper; and
   a metallic salt in an amount ranging from about 20 pounds to about 25 pounds per ton of the paper;
   wherein the alkenyl succinic anhydride internal sizing agent is incorporated into the paper during a wet end operation of papermaking, and wherein the paper exhibits an ink transferability of equal to or less than 13% and a black optical density of greater than about 1.5;
   and wherein the metallic salt is incorporated into the paper during a wet end operation of papermaking.

2. The paper as defined in claim 1 wherein the internal sizing agent and the metallic salt are adapted to provide the paper with a total sizing less than about 70 as measured by a Hercules Sizing Test.

3. The paper as defined in claim 1 wherein the paper is adapted to have indicia formed thereon with color pigmented ink, the indicia having substantially increased lightfastness and substantially increased color gamut.

4. The paper as defined in claim 1 wherein the paper is selected from plain paper or photopaper.

5. The paper as defined in claim 3 wherein the color pigmented ink is selected from a disazo yellow pigment class, a bis-acetoacetarylide yellow pigment class, and combinations thereof.

6. The paper as defined in claim 3 wherein the color pigmented ink is selected from yellow ink 93, yellow ink 128, yellow ink 155, and combinations thereof.

7. The paper as defined in claim 1 wherein the internal sizing agent and the metallic salt are adapted to provide the paper with a total sizing less than about 30 as measured by a Hercules Sizing Test.

8. The paper as defined in claim 1 wherein the paper is adapted to have indicia formed thereon with black pigment ink having a binder therein, the indicia having substantially increased optical density and substantially decreased drytime.

9. The paper as defined in claim 1 wherein the metallic salt is selected from calcium chloride, magnesium chloride, aluminum chloride, beryllium chloride, calcium nitrate, magnesium nitrate, aluminum nitrate, beryllium nitrate, and combinations thereof.

10. The paper as defined in claim 1 wherein the internal sizing agent and the metallic salt are each soluble in an aqueous medium at a pH ranging from about 4 to about 10.

11. The paper as defined in claim 10 wherein the internal sizing agent and the metallic salt are each soluble in an aqueous medium at a pH ranging from about 4 to about 6.5.

12. The paper as defined in claim 1 wherein the alkenyl succinic anhydride internal sizing agent is present in an amount ranging from about 1.2 pounds per ton to about 1.8 pounds per ton of paper.

13. A method for using the paper of claim 1, the method comprising jetting, via an inkjet printer, pigmented color ink on a surface of the paper to form an indicia.

14. A method for using the paper of claim 1, the method comprising jetting, via an inkjet printer, black pigment ink having a binder therein on a surface of the paper to form an indicia, a combination of the black pigment ink and the paper is adapted to form indicia having substantially increased optical density and substantially decreased drytime.

* * * * *